(12) United States Patent
Green

(10) Patent No.: US 6,447,225 B1
(45) Date of Patent: Sep. 10, 2002

(54) SPINDLE ASSEMBLY DRIVE

(75) Inventor: Lanny Green, Grass Lake, MI (US)

(73) Assignee: Ann Arbor Machine Company, Chelsea, MI (US)

( * ) Notice: Subject to any disclaimer, the term of this patent is extended or adjusted under 35 U.S.C. 154(b) by 57 days.

(21) Appl. No.: 09/643,622

(22) Filed: Aug. 22, 2000

(51) Int. Cl.[7] .............................. B23C 1/04; B23Q 1/70; B23Q 5/04
(52) U.S. Cl. ........................ 409/231; 409/192; 409/213; 408/48; 408/53; 408/128; 74/665 GE; 474/87
(58) Field of Search .................................. 409/231, 192, 409/203, 217, 213; 408/48, 53, 43, 46, 128; 474/87; 74/665 GE

(56) References Cited

U.S. PATENT DOCUMENTS

| | | | |
|---|---|---|---|
| 1,340,953 A | * 5/1920 | Gwyer | .................. 474/87 |
| 2,281,628 A | 5/1942 | Snader | |
| 2,620,677 A | * 12/1952 | Ciborowski | ................ 474/213 |
| 2,731,050 A | * 1/1956 | Nunn | .......................... 408/46 |
| 3,200,672 A | 8/1965 | Kawasaki | ................... 408/53 |
| 3,664,111 A | 5/1972 | Weber et al. | |
| 3,749,507 A | 7/1973 | Haley | |
| 4,535,527 A | 8/1985 | Fischer et al. | |
| 4,612,760 A | 9/1986 | Wolf et al. | |
| 4,867,618 A | * 9/1989 | Brohammer | ................ 409/231 |
| 5,179,826 A | 1/1993 | Yasuda et al. | |
| 5,630,685 A | * 5/1997 | Susnjara et al. | ............ 409/231 |
| 5,908,270 A | 6/1999 | Araki | |

OTHER PUBLICATIONS

MSC Industrial Supply Co. Catalog, published Sep. 1999, p. 3514.*

* cited by examiner

Primary Examiner—A. L. Wellington
Assistant Examiner—Erica E Cadugan
(74) Attorney, Agent, or Firm—Olson & Hierl, Ltd.

(57) ABSTRACT

A spindle assembly, with improved belt drive, is suitable for a multi-axis machining cell providing tool movements along predetermined axes of motion, such as the X-, Y- and Z-axes. Plural machining spindles, each provided with a driven pulley, are mounted to a headstock of a machining cell. A spindle, drive motor is also mounted to the headstock and is provided with a drive pulley. A drive belt is trained, preferably by serpentine wrap, over the drive pulley and subsets of driven pulleys, and transmits rotational motion from the drive pulley to the driven pulleys. Preferably, at least one set of drive pulley and driven pulleys is constituted by herringbone sprockets.

13 Claims, 8 Drawing Sheets

SPINDLE ASSEMBLY DRIVE

TECHNICAL FIELD OF THE INVENTION

This invention relates to a spindle assembly for a multi-axis machining cell, and specifically, to a spindle assembly having multiple spindles driven in an efficient manner.

BACKGROUND OF THE INVENTION

Machine tools provided with at least one machining station are typically used for performing drilling, reaming, boring, milling and other machining operations on workpieces.

A machining station of this type essentially includes a machine base upon which is mounted a carrier frame and a machine head. The frame and head may be fitted with a hood that is movable to an open position to allow access to the working area and the various machine tool components located therein.

The carrier frame is slidably movable along horizontal perpendicular paths, designated by axes. The machine head, mounted to a separate carrier, is typically slidably movable perpendicular to the carrier frame along a vertical path (also designated by an axis). The movements of both the carrier frame and the machine head are typically directed by computer-numerically-controlled (CNC) drives.

The machine head of a given machining station includes a motor-driven spindle intended to accommodate and rotatably drive a machine tool for performing a predetermined machining operation on a given workpiece. As discussed above, the tool may be a drill, boring head, milling cutter, or other.

One drawback of these machine tools lies in the fact that it is necessary for the operator to interrupt a given machining operation to load and unload a specific tool within the spindle of the machine head either manually or by using an automatic tool changer. Such a tool change is necessary when both changing the type of tool required for a specific machining operation and when replacing a worn tool of a given type with a new tool.

This tool change procedure often results in a considerable loss of time in the output rate of a given machine and, consequently, during the overall manufacturing cycle. Such losses are contrary to current industrial output requirements with emphasis on high speed machining. Moreover, conventional tool change procedures are not sufficiently reliable for high speed, high volume machining.

To remedy the shortcomings associated with tool change, various tool change mechanisms for automatic transfer (load and unload) of tools between the spindle and storage have been proposed.

Such automated tool change procedure usually includes the following steps: upon signal that a given tool must be exchanged or replaced, the spindle, having the tool inserted therein, must be withdrawn from the workpiece; the rotational speed of the spindle is reduced to zero while the spindle is advanced to the tool storage magazine, where the tools are exchanged; the spindle then withdraws from the magazine, rotationally accelerates to the desired rotational cutting speed, and then advances toward the workpiece for further machining operations.

Such a procedure nonetheless requires an excessive time period for tool change due to the required movements of the spindle between the workpiece and tool storage magazine, as well as due to the deceleration and acceleration of the spindle, as well as clamping and unclamping of a tool within. the spindle. Productivity is necessarily reduced, because during tool exchange, the machine tool is unavailable for operation on the workpiece.

Thus, a need exists for a machine that allows for an exchange of tools during a machining operation while further minimizing the time required for the tool exchange, while also increasing the reliability of tool change and the positional accuracy of the tool setting.

SUMMARY OF THE INVENTION

The present invention provides a novel and improved spindle assembly which reduces the foregoing disadvantages associated with the prior art and provides advantages in construction, mode of operation, and use.

To achieve the foregoing, the present invention comprises a single headstock or slide with a plurality of spindles located thereon. Each spindle is operatively connected to a drive motor via a belt and pulley arrangement. Subsets of the plurality of spindles can be driven by the same belt, if desired.

While one of the spindles on the headstock carries out a machining operation on a workpiece, another spindle or spindles, already loaded with tools therein, stand ready for engagement with the workpiece. When the spindle performing a prior operation has completed its task, the spindle carrying a new tool for a subsequent operation can be applied to the workpiece with a minimal delay.

In this manner, the tool exchange time after completion of an operation on the workpiece is limited to that length of time normally required to merely move a spindle from one operating position to another and accelerate across the difference in speed between the two tools. No additional time is required to exchange the tools. Furthermore, no transfer device nor storage magazine is required for tool exchange. Additionally, there is no possibility of introducing contamination at the tool-spindle interface.

DESCRIPTION OF THE PREFERRED EMBODIMENT

Figure 1:
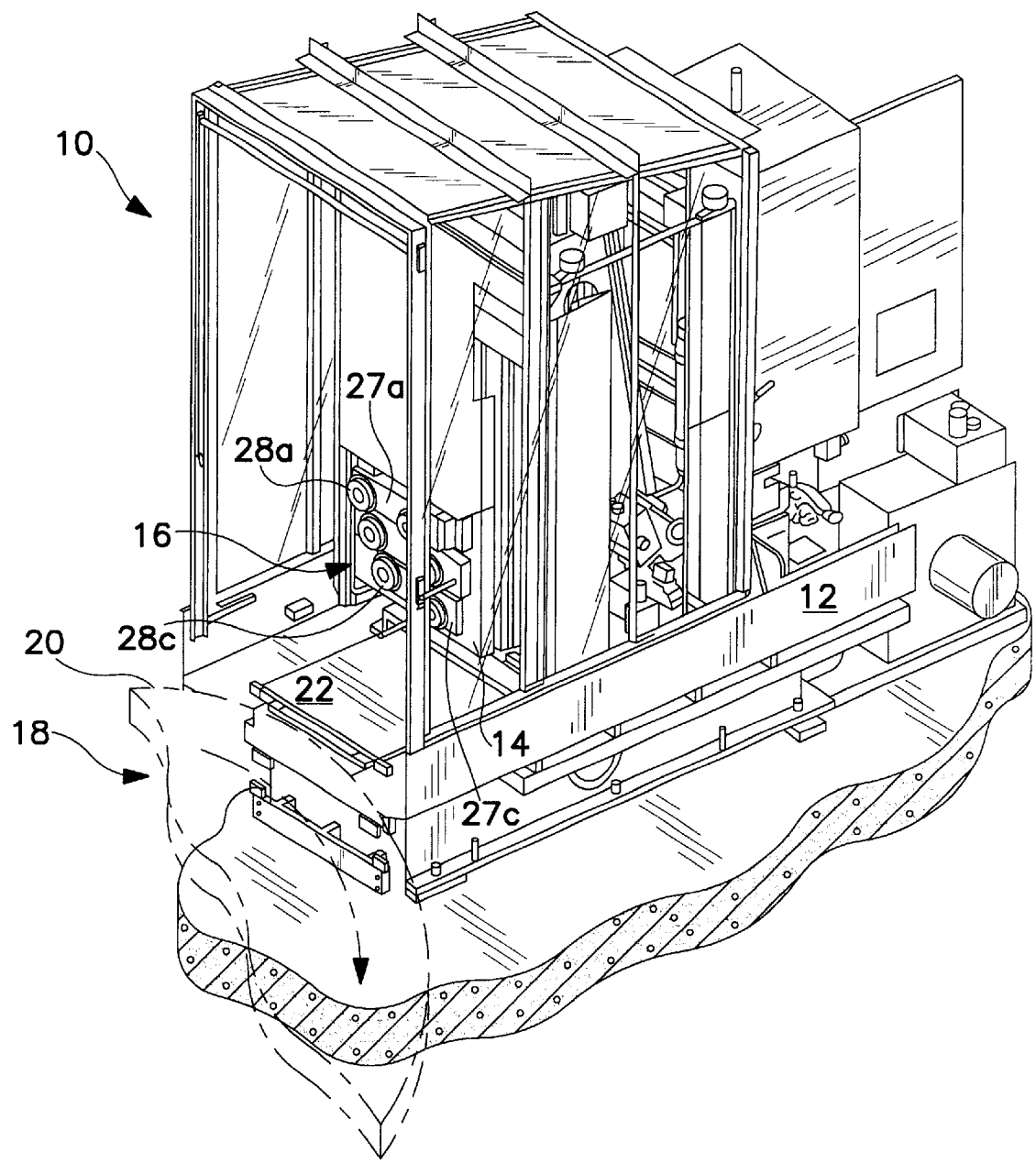
FIG. 1 is a perspective view of a machining cell illustrating a preferred embodiment of the present invention.

The invention disclosed herein is, of course, susceptible of embodiment in many different forms. Shown in the drawings and described herein below in detail are preferred embodiments of the invention. It is to be understood, however, that the present disclosure is an exemplification of the principles of the invention and does not limit the invention to the illustrated embodiments.

For ease of description, a machine embodying the present invention is described herein below in its usual assembled position as shown in the accompanying drawings, and terms such as upper, lower, horizontal, longitudinal, etc., may be used herein with reference to this usual position. However, the machine may be manufactured, transported, sold, or used in orientations other than that described and shown herein.

The term "pulley," as used herein and in the appended claims, means a wheel with a grooved, flat, serrated, toothed, or slightly convex rim adapted to receive a band, such as a belt, which runs over it and transmits power. Included within the term "pulley" as used herein are belt-driven sprockets having a helical offset tooth rim, sometimes also referred to as herringbone sprockets.

The term "spindle," as used herein and in the appended claims, means a shaft or mandrel which supports a rotating tool such as a milling cutter, drill, and the like.

Referring to FIG. 1, a machining center 10 providing tool movements along plural axes of motion and embodying the present invention is comprised of a rectangular machine base 12 having a movable slide or headstock 14 mounted thereto. Mounted to the slide or headstock 14 is a multiple spindle machining assembly 16. The spindle assembly 16 is movable along both a horizontal and vertical plane defined by three axes of motion, namely the X-, Y- and Z-axes.

The spindle assembly 16 is constituted by three distinct subsets of spindles and serves to rotate various machine tools. The spindle assembly 16, driven by a motor (not shown in FIG. 1), rotates the various tools secured thereto to accomplish a predetermined machining operation on a workpiece (not shown).

Separate from the machining center 10 and located in front of the machining center base 12 is a workpiece carrier 18. The workpiece carrier 18, for holding a workpiece to be operated on by machining center 10, can be provided with an indexing table 20 or other arrangements to include a turning arrangement, pallet clamping device, a pallet exchange device, or other workpiece holding device common to the machining industry. With the aforementioned arrangement, a workpiece mounted on the carrier 18 can thus be machined or operated on by the rotating tools secured to the spindle assembly 16, with the spindle assembly 16, movable along three axes.

Figure 2:
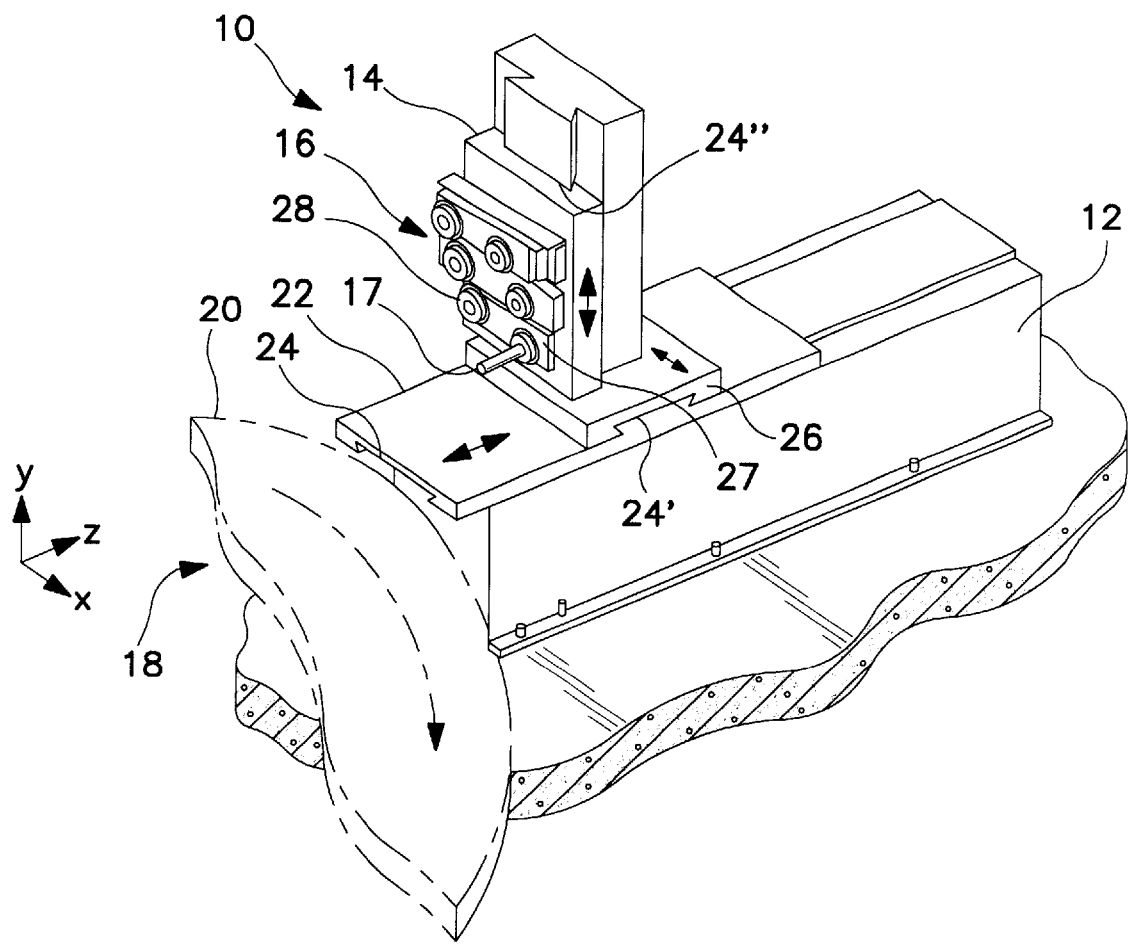
FIG. 2 is a perspective view of a machining cell simplified to show the translational components associated with the spindle assembly in accordance with a preferred embodiment of the invention.

The movable slide or headstock 14 and attached spindle assembly 16 is illustrated in greater detail in FIG. 2. Machining center 10 comprises a base 12 having a slidable carriage 22 mounted thereto. The base 12 is preferably formed of heavy fabricated or cast components, as is common in the machine tool art, and can be securely fastened to a shop floor using bolts or similar fasteners.

Carriage 22 is slidably mounted to the rectangular base, movable horizontally along a lengthwise axis with respect to the base 12. The movement of the carriage 22 with respect to the base 12 is limited to an axial, sliding movement by the use of a lubricated V-guide 24 or other similar guide arrangement well known in the machine tool industry.

As illustrated in FIG. 2, this axially lengthwise movement follows what is designated as the Z-axis. Movement or translation of the carriage 22 along the Z-axis can be accomplished hydraulically or through the use of a motor-driven ball screw (not shown).

Mounted to the carriage 22 is a carrier frame 26. Carrier frame 26 is slidably movable horizontally along a transverse axis (the X-axis) with respect to the base 12. The movement of the carrier frame 26 with respect to the carriage 22 is limited to an axial, sliding movement, again through the use of a lubricated V-guide 24' or other similar guide widely known in the machining industry.

Movement or translation of the carrier frame 26 along the X-axis also is accomplished through the use of a hydraulic motor or a motor-driven ball screw (not shown).

Mounted to the carrier frame 26 is a slide or headstock 14 which is slidably mounted to the carrier frame 26, movable vertically with respect to the base 12. Like that of the carriage 22 and carrier frame 26, movement of the slide or headstock 14 with respect to the carrier frame 26 is limited to an axial, sliding movement through the use of a lubricated V-guide 24" or other similar guide widely known in the machining industry.

This vertical movement follows what is designated as the Y-axis. Movement or translation of the slide or headstock 14 along the Y-axis can also be accomplished through the use of a hydraulic motor or a motor-driven ball screw.

Figure 3:
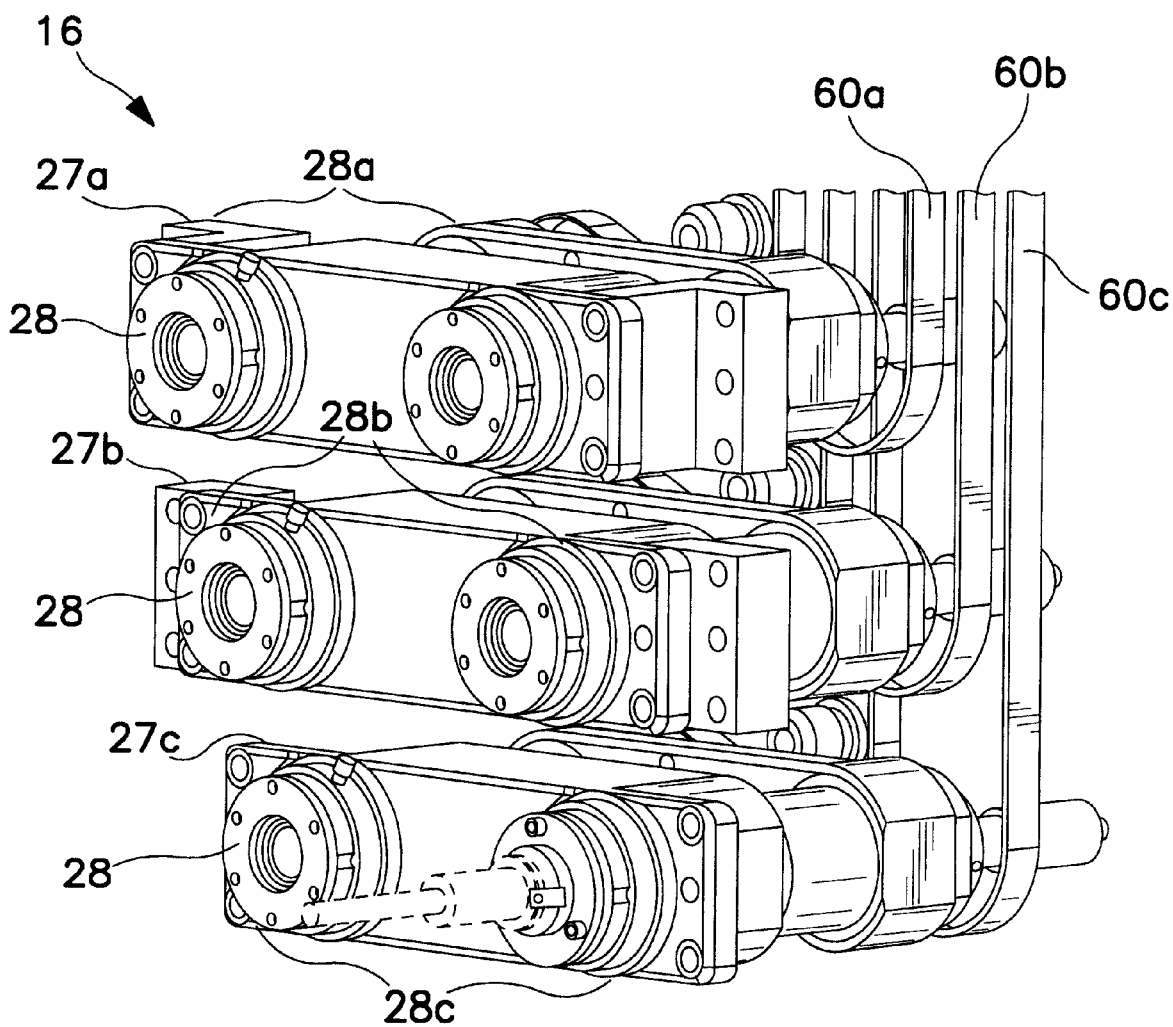
FIG. 3 is a perspective view of the spindle assembly in accordance with a preferred embodiment of the invention.

Shown in FIG. 3 is a multiple spindle assembly 16 embodying the present invention. The multiple spindle machining assembly 16 comprises a plurality of spindles 28, arranged in pairs, mounted to a slide or headstock. Three spacer plates 27a, 27b, and 27c are of different thicknesses and are provided for three associated spindle pairs 28a, 28b, and 28c. The spindle assembly 16 may be comprised of any number of spindles and distinct spindle subsets, including drill head assemblies, as desired.

Each of spacer plates 27a, 27b, and 27c is mounted to a suitable support such as the aforementioned slide or headstock 14 shown in FIG. 1. In the embodiment shown, the machining spindle pairs 28a, 28b, and 28c are mounted to respective spacer plates 27a, 27b, and 27c, with each spindle of a given pair in an axially parallel relationship to one another. Each of spacer plates 27a, 27b, and 27c comprise a steel plate. Each plate has a predetermined thickness that provides desired positioning of the tool as well as structural rigidity against torsional forces exerted on a given spindle.

Figure 4:
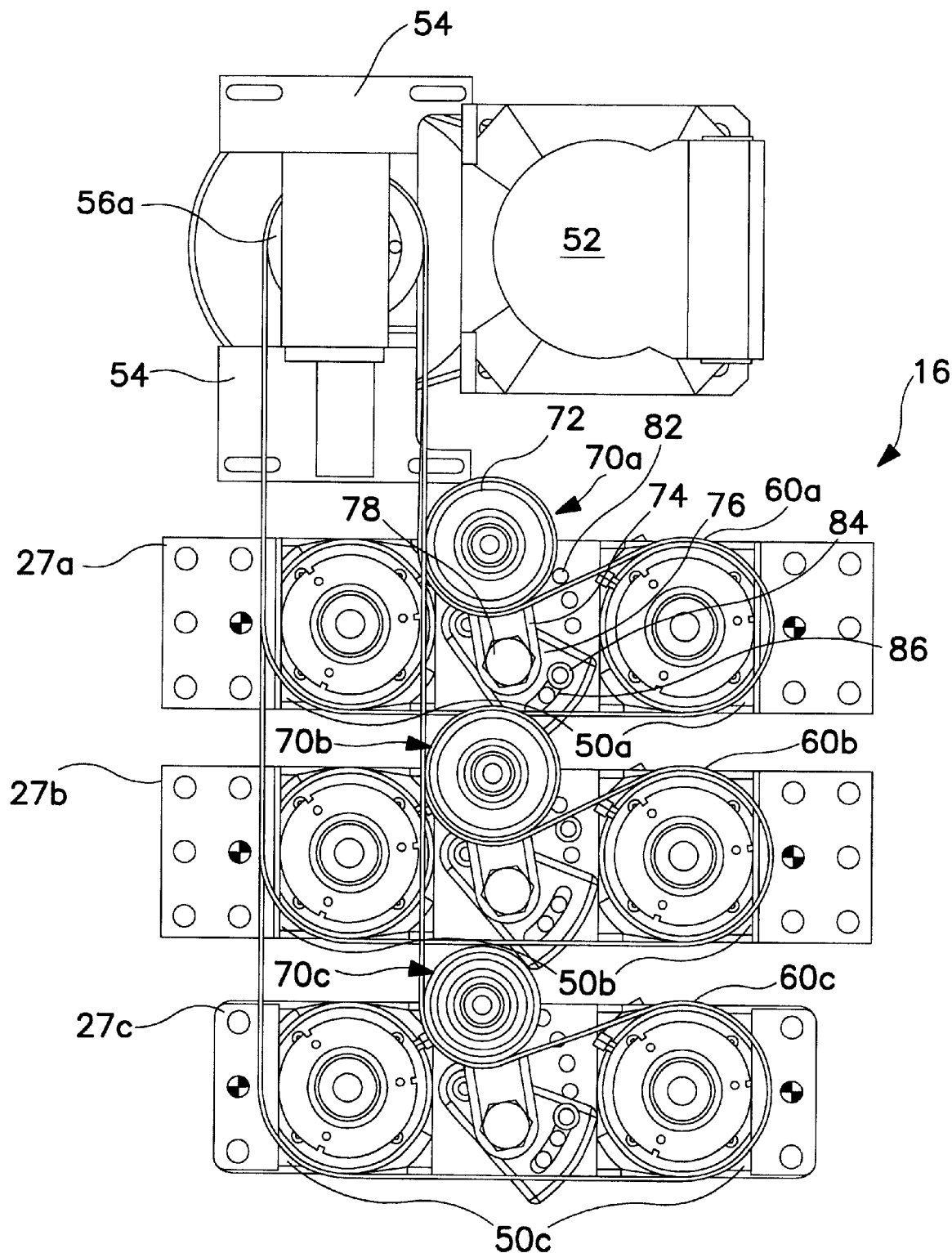
FIG. 4 is a sectional view of a typical spindle in accordance with a preferred embodiment of the invention.
Figure 6:
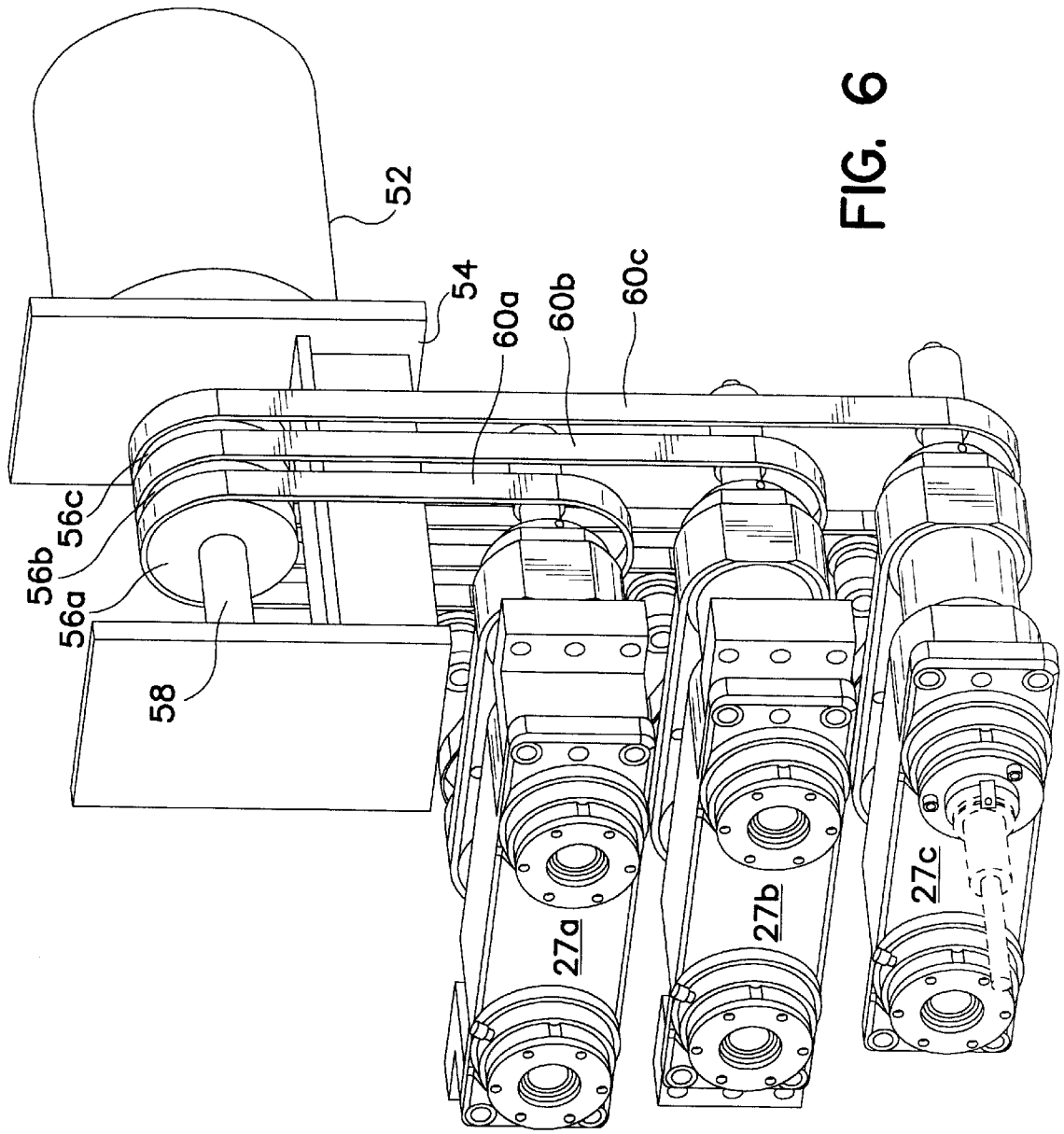
FIG. 6 is a perspective view of the spindle assembly directly driven by a drive motor in accordance with a preferred embodiment of the invention.

As illustrated in FIG. 4, each spindle 28 of a spindle pair, such as pairs 28a, 28b and 28c, has a driven pulley mounted thereon, resulting in paired driven pulleys 50a, 50b, and 50c. Belts 60a, 60b, and 60c are trained by serpentine wrap over the respective driven pulleys and the drive pulleys 56a, 56b, and 56c (FIG. 6).

To ensure that a given drive belt remains properly entrained around its respective driven pulley or pulley pair, drive belt tensioners 70a, 70b, and 70c are provided.

Drive belt tensioners 70a, 70b, and 70c are each comprised of a tensioner pulley 72, rotatably mounted to a tensioner arm 74. The tensioner arm 74 is pivotably mounted to a tensioner bracket 76, which in turn, is pivotably mounted to the headstock or slide. The tensioner arm 74 is. pivotally mounted to the tensioner bracket 76 via a bolt 78. The bolt 78 can be tightened to secure the position of the tension arm 74 with respect to the bracket 76, thus allowing for the radial adjustment and fixation of the tensioner pulley 72 location with regard to the drive belt.

A radial slot 80 is located in the tensioner bracket 76, opposite of the bracket's pivot point, with the tension arm 74 pivotably mounted to the bracket 76 between the two. Furthermore, a plurality of threaded adjustment holes 82, equally spaced a predetermined distance from one another are located in the carrier frame, radially aligned with the radial slot 80 of the bracket 76. The radial slot 80 is adapted to accept the insertion of fixation bolt 84 therethrough for threaded engagement with one of the adjustment holes 82 of the carrier plate.

Because the tensioner arm 74 is mounted to the bracket 76 between the pivot point and the radial slot 80, pivotal adjustment of the bracket 76 results in an approximately vertical translation of the tensioner pulley 72. Entrainment of the drive belt around the driven pulleys of the spindle pair defines a drive belt inside and outside surface, with the inside surface of the drive belt engaging the driven pulleys.

The tensioner pulley 72 is positioned on the carrier frame to engage the outside surface of a drive belt section between the drive (or intermediate drive) pulley and a driven pulley of a given driven pulley pair. The tensioner bracket 76 is pivotably connected to the carrier frame in a location between the spindles of each spindle pair.

With the tensioner pulley 72 in engagement with the outside surface of the drive belt, vertical translation of the pulley 72, achieved through a pivotal adjustment of the bracket 76, results in a tensioning adjustment of the drive belt.

Driven pulleys 50 on each spindle of a given pair also lie in a common plane. Having the driven pulleys of a given pair of spindles lie in a common. plane thus ensures alignment of the two pulleys to allow a common drive belt to be remain entrained on both pulleys.

Figure 5:
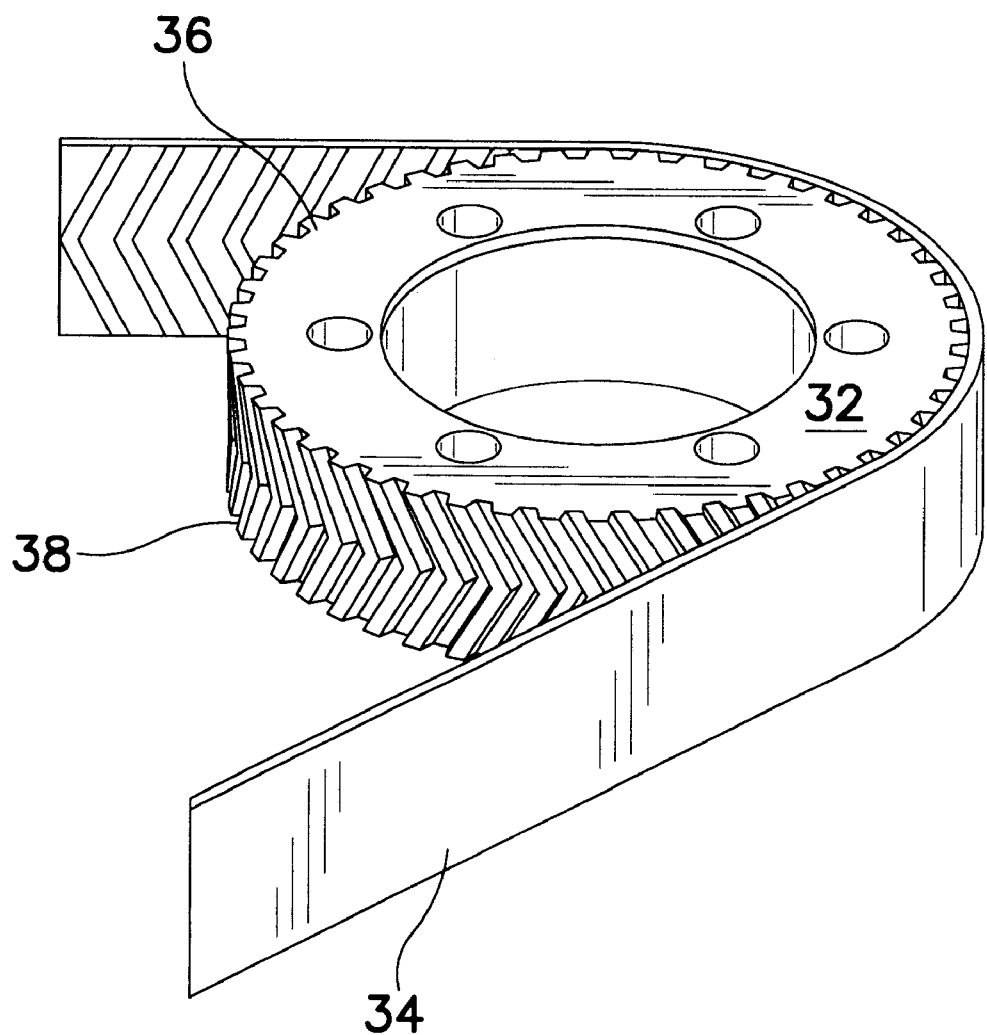
FIG. 5 is a partial perspective view illustrating a herringbone sprocket having a helical offset tooth rim and a belt trained around the sprocket.

For increased belt efficiency and performance in high speed machining operations, preferred pulleys are the so-called herringbone sprockets provided with a helical offset tooth rim. Such pulleys are illustrated in FIG. 5 where belt 34 is shown trained around herringbone sprocket 32. Rim 36 of sprocket 32 is provided with helically offset teeth 38.

In a preferred embodiment of this invention at least one set of a drive pulley and driven pulleys is constituted by herringbone sprockets.

The transmission of rotation of the driving motor to each of the spindle pairs will now be described in detail with reference to FIGS. 6 and 7. Driving motor 52 is removably mounted to motor frame 54 which is, in turn, removably mounted to the headstock or slide (not shown). Within the motor frame, the motor can drive, directly or indirectly, the paired driven pulleys 50*a*, 50*b*, and 50*c* of the spindle pairs 28*a*, 28*b* and 28*c* of spindle assembly 16.

With further reference to FIG. 6, a description of the direct drive relationship between the motor and driven pulleys of the spindle pairs thus follows. With the direct driving relationship, a plurality of drive pulleys, i.e., pulleys 56*a*, 56*b*, and 56*c*, are fixedly secured, parallel to each other, to the output shaft 58 of the driving motor 52, with each drive pulley on the motor output shaft 58 associated with a given pair of spindles of the spindle assembly. In this particular embodiment, motor output shaft 58 also serves as the drive shaft for the drive pulleys.

The drive pulleys 56*a*, 56*b*, and 56*c* are entrained with respective drive belts 60*a*, 60*b* and 60*c*, each of which, in turn, entrains respective driven pulley pairs 50*a*, 50*b*, and 50*c*. With this arrangement, the motor thus directly rotates a total of six spindles comprising the three spindle pairs.

Figure 7:
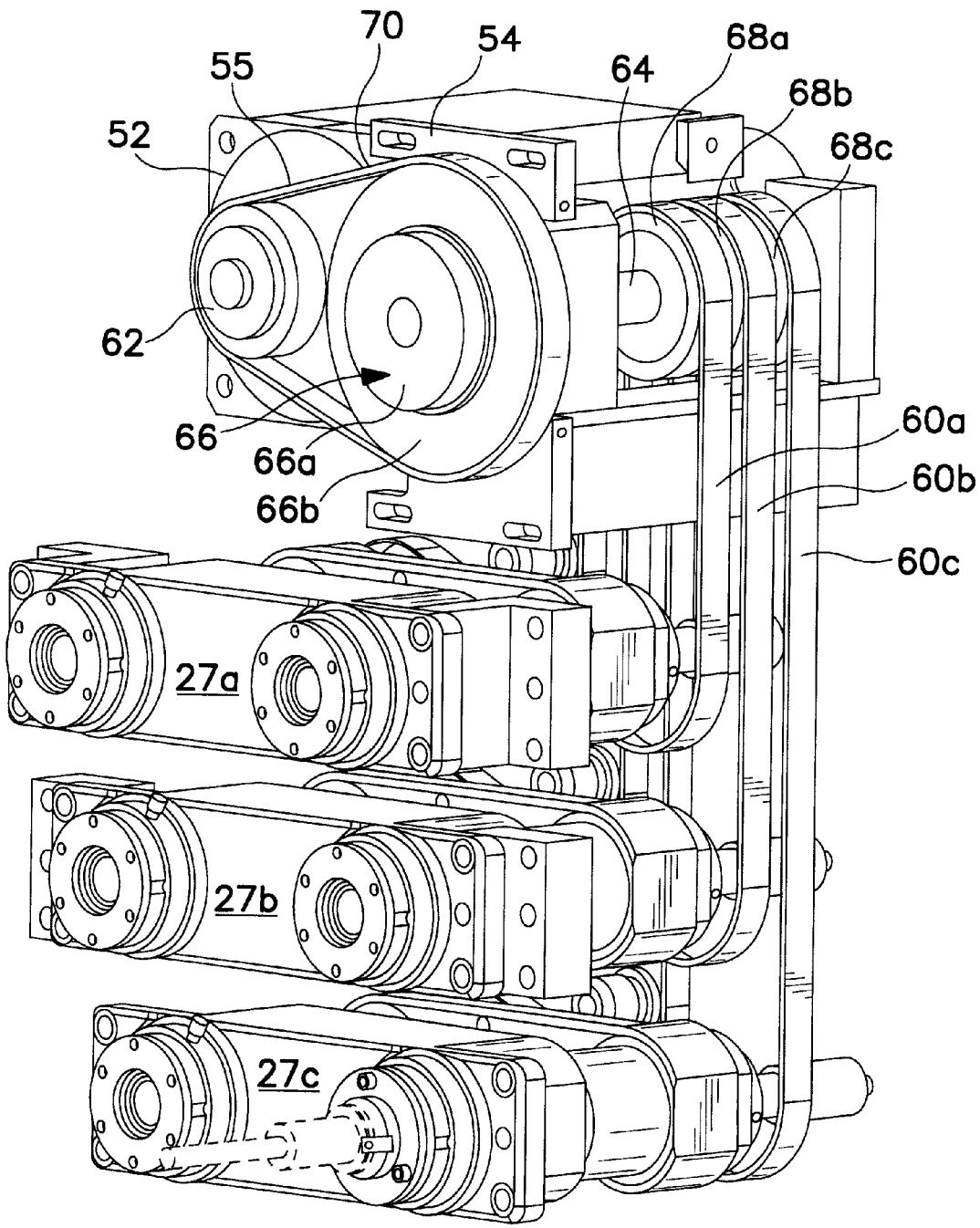
FIG. 7 is a perspective view of the spindle assembly indirectly driven by a drive motor in accordance with a preferred embodiment of the invention.

With regard to the indirect driving relationship between the motor and driven pulley illustrated in FIG. 7, an intermediate power transfer pulley 62 is mounted on the shaft 58 of drive motor 52. Mounted on adjustable flange 54 next to the drive motor 52 and in parallel relation therewith is drive shaft 64. Flange 54 is adjustable in order to provide a convenient way of tensioning for belt 55. At the distal end of the drive shaft 64 is another intermediate power transfer pulley 66, while at the proximal end of the drive shaft. 64 is a plurality of drive pulleys, 68*a*, 68*b* and 68*c* fixedly secured to drive shaft 64 and parallel to each other. Each drive pulley on drive shaft 64 is associated with a given pair of spindles of the spindle assembly.

The drive pulleys 68*a*, 68*b*, and 68*c* are entrained with respective drive belts 60*a*, 60*b* and 60*c*, each of which, in turn, entrains respective driven pulley pairs 50*a*, 50*b*, and 50*c*.

In the embodiment shown in FIG. 7, a primary drive belt 70 is entrained around both the intermediate power transfer pulley 62 on the motor shaft 58 and the intermediate power transfer pulley 66 located at the distal end of drive shaft 64. With this arrangement, the motor thus drives drive pulleys 68*a*, 68*b*, and 68*c*, which rotate a total of six spindles comprising the three spindle pairs.

The intermediate power transfer pulley 66 of the drive shaft 64 can provide two axially aligned sections of different diameter to form pulley portions 66*a* and 66*b*, if desired. One can change the rotational speed of all three spindle pairs simultaneously simply by entraining the primary drive belt 70 around either one of the two pulley portions 66*a* and 66*b* in this manner.

Although the power transfer pulley 66 illustrated in FIG. 7 is divided into two portions of different diameter, sections 66*a*, and 66*b*, one of ordinary skill in the machining art would understand that such a pulley can be provide any number of portions, with each portion having a different diameter, if desired.

Figure 8:
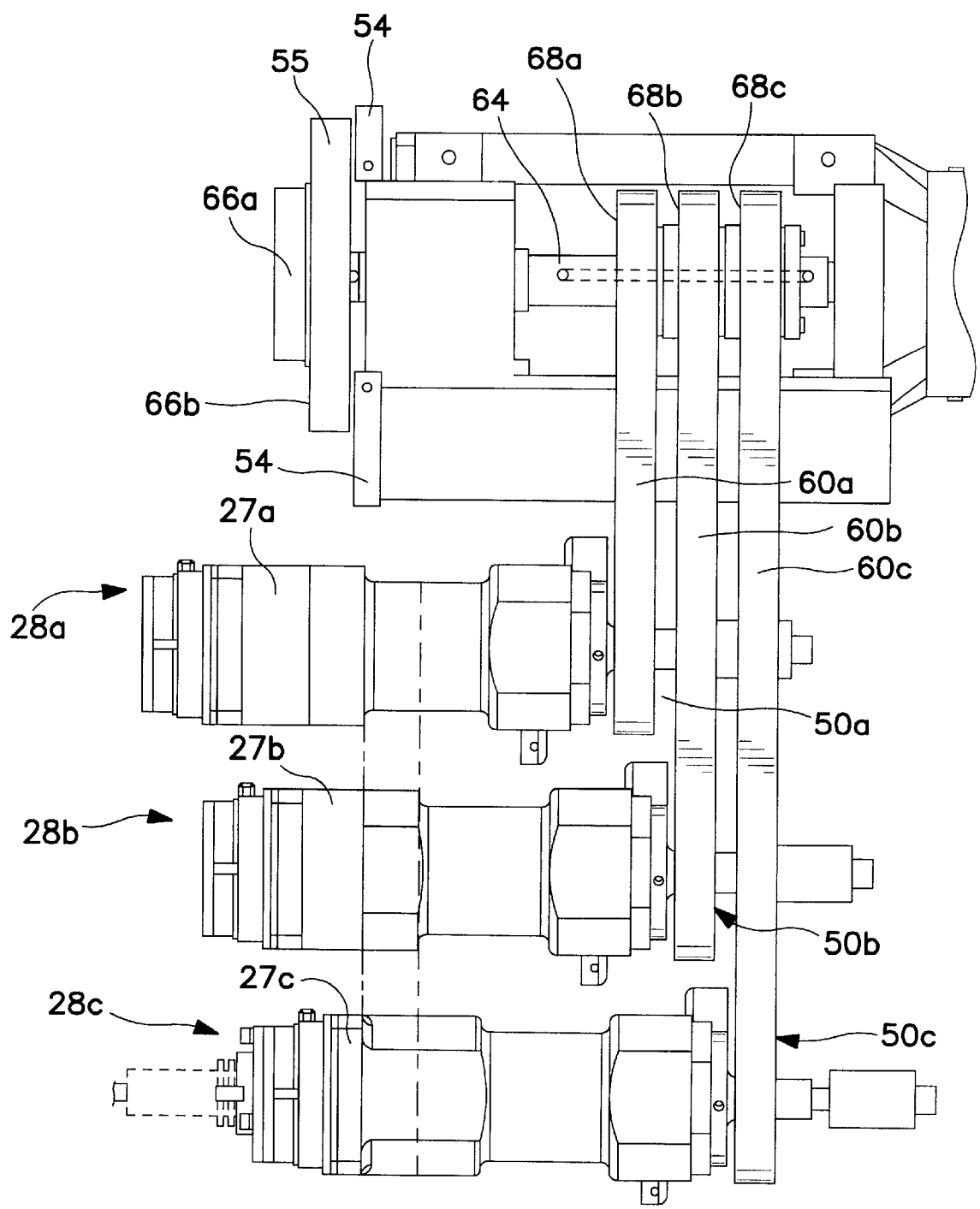
FIG. 8 is a plan view of the spindle assembly indirectly driven by a motor showing the parallel drive belt relationship in accordance with a preferred embodiment of the invention

Whether directly of indirectly driven, the relationship between each of the drive belts and each of the spindle pairs warrants further discussion. Referring now to FIG. 8, a side view of the embodiment shown in FIG. 7, it will be apparent that drive belts 60*a*, 60*b*, and 60*c*, trained over respective drive pulleys 68*a*, 68*b*, and 68*c*, are juxtaposed relative to one another in substantially parallel paths at the drive pulleys and define drive paths of different, i.e., uneven, length when entrained on the driven pulleys of respective spindle pairs 28*a*, 28*b* and 28*c*.

Spacer plates 27*a*, 27*b*, and 27*c* are vertically disposed in a parallel relationship to one another. Also, as discussed previously, the two spindles which comprise a spindle pair lie axially parallel to one another, with the driven pulley of each spindle of a given subset or pair also having a parallel relationship to one another.

Because the indirect drive pulleys 68*a*, 68*b*, and 68*c* (or direct drive pulleys 56*a*, 56*b*, and 56*c*) lie side-by-side on the intermediate drive axle 64 (or direct drive shaft 58), the drive belts 60*a*, 60*b*, and 60*c* trained on such pulleys by serpentine wrap must also lie in a side-by-side relationship. In keeping with the side-by-side relationship of the drive belts, it thus follows that each pair of driven pulleys, driven pulley pairs 50*a*, 50*b*, and 50*c*, vertically disposed of one another, must also be displaced laterally of one another.

If all spindles, regardless of paired relationship, have a common length, with the driven pulley mounted laterally in the same location along the spindle body for all spindles, and the carrier plates 27*a*, 27*b*, and 27*c* lie vertically parallel of one another, each spindle pair is offset laterally from the other spindle pairs, through their respective spacer plates 27*a*, 27*b*, and 27*c*, by at least a belt width to accommodate the side-by-side placement of the drive belts 60*a*, 60*b* and 60*c*.

In such cases the distal ends of each vertically disposed spindle pair are laterally offset from those of the other spindle pairs. In the embodiment shown in FIG. 8, the distal ends of the top spindle pair 28a are offset distally by at least one belt width from those of the middle spindle pair 28b, while the distal ends of the middle spindle pair 28b are offset distally by at least one belt width from those of the bottom spindle pair 28c. While the spindle pairs are offset laterally of one another, their respective spacer plates 27a, 27b, and 27c remain vertically disposed in a substantially parallel relationship relative to one another.

In operation, a workpiece is mounted to the workpiece carrier, positioned in front of the machining cell. Tools are mounted to two or more spindles of the multiple spindle assembly. The multiple spindles, commonly driven by a drive motor, are accelerated to a predetermined cutting speed. An operator adjusts the position of the carriage, carrier frame, and slide or headstock to engage one of the machining tools with the workpiece.

When the operator desires to change the tool engaged with the workpiece, the operator withdraws the tool from the workpiece and adjusts the position of the carriage, carrier frame, and slide or headstock to engage a different tool with the workpiece.

The foregoing description and the accompanying drawings are illustrative of the present invention. Still other variations and arrangements of parts are possible without departing from the spirit and scope of this invention.

I claim:

1. A spindle assembly suitable for a multi-axis machining cell and comprising:
   a headstock mounted for movement in a pre-determined plane;
   plural machining spindles mounted to the headstock spaced from one another and each provided with a driven pulley;
   a spindle drive motor mounted to the headstock;
   a drive shaft with at least one drive pulley operably associated therewith for rotating the machining spindles;
   at least one drive belt trained by serpentine wrap over plural driven pulleys for concurrently transmitting rotational motion from the drive pulley to said plural driven pulleys; and
   a drive belt tensioner mounted to the headstock and positioned to engage said at least one drive belt wherein:
      paired machining spindles are mounted to the headstock and each machining spindle of each pair of said paired machining spindles has a driven pulley connected thereto;
      a separate drive pulley is provided on the shaft for rotating each pair of said paired machining spindles;
      a separate drive belt is provided for driving each pair of said paired machining spindles and defining a drive path; and
      a separate belt tensioner is provided for each said pair of machining spindles mounted to the headstock and positioned to engage said separate drive belt driving said pair of machining spindles.

2. A spindle assembly suitable for a multi-axis machining cell and comprising:
   a headstock mounted for movement in a pre-determined plane;
   plural machining spindles mounted to the headstock spaced from one another and each provided with a driven pulley;
   a spindle drive motor mounted to the headstock;
   a drive shaft with at least one drive pulley operably associated therewith for rotating the machining spindles;
   at least one drive belt trained by serpentine wrap over plural driven pulleys for concurrently transmitting rotational motion from the drive pulley to said plural driven pulleys; and
   a drive belt tensioner mounted to the headstock and positioned to engage said at least one drive belt wherein:
      pairs of machining spindles are removably mounted to the headstock and each machining spindle of each said pair has a driven pulley connected thereto;
      a separate drive pulley is provided on the shaft for rotating each said pair of the machining spindles;
      a separate drive belt is provided for each said pair of the machining spindles with respective drive belts for each said pair of machining spindles in a substantially parallel relationship relative to one another and defining drive paths of uneven length; and
      a separate belt tensioner for each said separate drive belt is mounted to the headstock and positioned to engage said separate drive belt provided for each said pair of machining spindles.

3. The spindle assembly in accordance with claim 2 wherein at least one drive pulley is a herringbone sprocket.

4. The spindle assembly in accordance with claim 2 wherein said drive pulley and the driven pulleys are herringbone sprockets.

5. The spindle assembly in accordance with claim 2 wherein the belt tensioner is pivotably mounted to a bracket which is in turn pivotably mounted to the headstock.

6. A machining cell providing tool movements along X, Y, and Z axes, and comprising:
   a machine base;
   a carriage slidably mounted to the machine base for horizontal movement along the Z axis;
   a carrier frame on the carriage and mounted thereto for horizontal movement along the X axis;
   a slide in the carrier frame mounted for vertical movement along the Y axis;
   at least one pair of machining spindles mounted to the slide, axially parallel to but spaced from one another, and each said machining spindle provided with a driven pulley;
   a spindle drive motor mounted to the slide;
   a drive shaft with a drive pulley associated therewith for rotating the machining spindles;
   at least one drive belt trained by serpentine wrap over the drive pulley and the driven pulleys for concurrently transmitting rotational motion from the drive pulley to the driven pulleys; and
   a drive belt tensioner mounted to the slide and positioned to engage the drive belt wherein:
      a seperate drive pulley is provided on the drive shaft for rotating each said pair of machining spindles;
      a seperate drive belt is provided for each said pair of machining spindles; and
      a seperate drive belt tensioner for each said drive belt is mounted to the headstock and positioned to engage each said drive belt.

7. The machining cell in accordance with claim 6 wherein said drive pulley is a herringbone sprocket.

8. The machining cell in accordance with claim 6 wherein said drive pulley and said driven pulley are herringbone sprockets.

9. A spindle assembly suitable for a multi-axis machining cell and comprising:
- a headstock mounted for movement in a pre-determined plane;
- plural machining spindles mounted to the headstock spaced from one another and provided with a driven pulley which is a herringbone sprocket;
- a spindle drive motor mounted to the headstock;
- a drive shaft with at least one drive pulley which is a herringbone sprocket operably associated therewith for rotating the machining spindles;
- at least one drive belt trained over said at least one drive pulley and said driven pulley for concurrently transmitting rotational motion from said at least one drive pulley to said driven pulley; and
- a drive belt tensioner mounted to the headstock and positioned to engage the at least one drive belt wherein:
  - pairs of said machining spindles are mounted to the headstock and each machining spindle of each pair of said paired machining spindles has a driven pulley connected thereto;
  - a separate drive pulley is provided, for each said pair, on the shaft for rotating each said pair of the paired machining spindles;
  - a separate drive belt is provided for each said pair of the paired machining spindles; and
  - a separate belt tensioner is provided for each said pair of said paired machining spindles mounted to the headstock and positioned to engage each said separate drive belt provided for each said pair of said paired machining spindles.

10. A spindle assembly suitable for a multi-axis machining cell and comprising:
- a headstock mounted for movement in a pre-determined plane;
- plural machining spindles mounted to the headstock spaced from one another and provided with a driven pulley which is a herringbone sprocket;
- a spindle drive motor mounted to the headstock;
- a drive shaft with at least one drive pulley which is a herringbone sprocket operably associated therewith for rotating the machining spindles;
- at least one drive belt trained over said at least one drive pulley and said driven pulley for concurrently transmitting rotational motion from said at least one drive pulley to said driven pulley; and
- a drive belt tensioner mounted to the headstock and positioned to engage the at least one drive belt wherein:
  - at least one pair of said machining spindles is removably mounted to the headstock and each machining spindle of each said pair has a corresponding driven pulley connected thereto;
  - a separate drive pulley is provided for each said pair on the shaft for rotating each pair of the paired machining spindles;
  - a separate drive belt is provided for each said pair of the paired machining spindles; and
  - a separate belt tensioner for each said pair of machining spindles is mounted to the headstock and positioned to engage each said separate drive belt provided for each said pair of machining spindles.

11. The spindle assembly in accordance with claim 10 wherein each belt tensioner is pivotably mounted to a bracket which is in turn pivotably mounted to the headstock.

12. The spindle assembly in accordance with claim 10 wherein each said drive belt is trained by serpentine wrap over the respective drive pulley and the driven pulleys for each said pair of machining spindles.

13. A machining cell providing tool movements along X, Y, and Z axes, and comprising:
- a machine base;
- a carriage slidably mounted to the machine base for horizontal movement along the Z axis;
- a carrier frame on the carriage and mounted thereto for horizontal movement along the X axis;
- a slide in the carrier frame mounted for vertical movement along the Y axis;
- at least one pair of machining spindles mounted to the slide, each spindle of the at least one pair being parallel to but spaced from one another, and each provided with a driven pulley;
- a spindle drive motor mounted to the slide;
- a drive shaft with a separate drive pulley for each said pair of machining spindles which drive pulley is a herringbone sprocket operably associated with the drive motor for rotating each said pair of machining spindles;
- a separate drive belt for each said pair of machining spindles, respective drive belts for each said pair of spindles, when more than one said pair is present, being in a substantially parallel relationship relative to one another and defining drive paths of unequal length; and
- a separate drive belt tensioner for each said separate drive belt mounted to the slide and positioned to engage each said drive belt.

* * * * *

UNITED STATES PATENT AND TRADEMARK OFFICE
CERTIFICATE OF CORRECTION

PATENT NO. : 6,447,225 B1
DATED : September 10, 2002
INVENTOR(S) : Lanny Green

It is certified that error appears in the above-identified patent and that said Letters Patent is hereby corrected as shown below:

Title page,
Item [57], ABSTRACT,
Line 6, after "spindle" delete the comma ",".

Column 2,
Line 1, after "within" delete the period ".".

Column 4,
Line 56, after "is" delete the period ".".

Column 5,
Line 25, after "common" delete the period "."

Column 6,
Line 4, after "shaft" delete the period "."

Column 7,
Line 43, after "from the" insert -- at least one --.
Line 48, "paired" should be -- pairs of said --.

Column 8,
Line 7, after "from the" insert -- at least one --.
Line 12, after "pairs of" insert -- said --.
Line 28, after "wherein said" insert -- at least one --.
Line 31, "the belt tensioner" should be -- each belt tensioner --.
Line 43, "axially" should be -- each spindle of the at least one pair being --.
Line 48, "a drive pulley" should be -- at least one drive pulley --.

UNITED STATES PATENT AND TRADEMARK OFFICE
CERTIFICATE OF CORRECTION

PATENT NO. : 6,447,225 B1
DATED : September 10, 2002
INVENTOR(S) : Lanny Green

It is certified that error appears in the above-identified patent and that said Letters Patent is hereby corrected as shown below:

Column 8 cont'd,
Lines 50, 52 and 55, after "the" insert -- at least one --.
Lines 63 and 65, after "wherein" insert -- each --.
Line 66, after "and" insert -- each --.

Signed and Sealed this

Thirtieth Day of September, 2003

JAMES E. ROGAN
*Director of the United States Patent and Trademark Office*